US009311323B2

(12) United States Patent
Chakraborty et al.

(10) Patent No.: US 9,311,323 B2
(45) Date of Patent: Apr. 12, 2016

(54) MULTI-LEVEL INLINE DATA DEDUPLICATION

(71) Applicant: INDIAN INSTITUTE OF TECHNOLOGY, KHARAGPUR, Kharagpur (IN)

(72) Inventors: Rajat Subhra Chakraborty, Chandannagore (IN); Bhanu Kishore Diddi, Guntur (IN)

(73) Assignee: INDIAN INSTITUTE OF TECHNOLOGY, KHARAGPUR, Kharagpur (IN)

( * ) Notice: Subject to any disclaimer, the term of this patent is extended or adjusted under 35 U.S.C. 154(b) by 207 days.

(21) Appl. No.: 13/885,395

(22) PCT Filed: Oct. 18, 2012

(86) PCT No.: PCT/IB2012/055688
§ 371 (c)(1),
(2) Date: May 14, 2013

(87) PCT Pub. No.: WO2014/037767
PCT Pub. Date: Mar. 13, 2014

(65) Prior Publication Data
US 2014/0114934 A1   Apr. 24, 2014

(30) Foreign Application Priority Data

Sep. 5, 2012   (IN) .......................... 1022/KOL/2012

(51) Int. Cl.
*G06F 7/00*   (2006.01)
*G06F 17/00*   (2006.01)
(Continued)

(52) U.S. Cl.
CPC ........ *G06F 17/30159* (2013.01); *G06F 3/0608* (2013.01); *G06F 3/0613* (2013.01); *G06F 3/0641* (2013.01)

(58) Field of Classification Search
CPC ................ G06F 17/30153; G06F 17/30097; G06F 17/30159
See application file for complete search history.

(56) References Cited

U.S. PATENT DOCUMENTS

| 6,829,355 | B2 * | 12/2004 | Lilly ............................... 380/28 |
| 7,836,387 | B1 | 11/2010 | Wong et al. |
| 2009/0307251 | A1 * | 12/2009 | Heller et al. .................. 707/101 |

(Continued)

OTHER PUBLICATIONS

International Search Report filed Oct. 18, 2012, mailed on Mar. 18, 2013.

(Continued)

*Primary Examiner* — Susan Chen
(74) *Attorney, Agent, or Firm* — Turk IP Law, LLC

(57) ABSTRACT

Technologies are presented for data deduplication that operates at relatively high throughput and with relatively less storage space than conventional techniques. Building upon content-dependent chunking (CDC) using Rabin fingerprints, data may be fingerprinted and stored in variable-size chunks. In some examples, data may be chunked on multiple levels, for example, two levels, variable size large chunks in the first level and fixed-size sub-chunks in the second level, in order to prevent sub-chunks common to two or more data chunks from not being deduplicated. For example, at a first level, a CDC algorithm may be employed to fingerprint and chunk data in content-dependent sizes (variable sizes), and at a second level the CDC chunks may be sliced into small fixed-size chunks. The sliced CDC chunks may then be used for deduplication.

19 Claims, 7 Drawing Sheets

(51) Int. Cl.
*G06F 17/30* (2006.01)
*G06F 3/06* (2006.01)

(56) References Cited

U.S. PATENT DOCUMENTS

| | | | |
|---|---|---|---|
| 2011/0099351 A1 | 4/2011 | Condict | |
| 2011/0307447 A1* | 12/2011 | Sabaa et al. | 707/637 |
| 2012/0053970 A1* | 3/2012 | Bhamidipaty et al. | 705/7.11 |
| 2012/0089579 A1* | 4/2012 | Ranade et al. | 707/693 |

OTHER PUBLICATIONS

Zhu et al., "Avoiding the Disk Bottleneck in the Data Domain Deduplication File System", In Proceedings of the 6th USENIX Conference on File and Storage Technologies (FAST'08), Article 18, 14 pages, Feb. 2008.

Wei et al., "MAD2: A scalable high-throughput exact de-duplication approach for network backup services". In Proceedings of the 2010 IEEE 26th Symposium on Mass Storage Systems and Technologies (MSST'10). IEEE Computer Society, Washington, DC, USA, May 1-14, 2010.

Rabin, "Fingerprinting by Random Polynomials". Center for Research in Computing Technology, Harvard University, Retrieved Mar. 22, 2007.

Bo et al., "Research on Chunking Algorithms of Data De-duplication". Proceedings of the ICCEAE2012, AISC 181, pp. 1019-1025, Jan. 2012.

Romanski et al, "Anchor-Driven Subchunk Deduplication", Proceedings of the 4th Annual International Conference on Systems and Storage Article No. 16, May 2011.

Kruus et al., "Bimodel Content Defined Chunking for Backup Streams", FAST'10 Proceedings of the USENIX Conference on File and Storage Technologies, 2010.

Bobbarjung et al., "Improving Duplicate Elimination in Storage Systems", ACM Transactions on Storage, vol. V, Jul. 2006.

* cited by examiner

MULTI-LEVEL INLINE DATA DEDUPLICATION

BACKGROUND

This Application is the National Stage filing under 35 U.S.C. §371 of PCT Application Ser. No. PCT/IB2012/055688 filed on Oct. 18, 2012, which claims priority under PCT Article 8 of India Application No. 1022/KOL/2012 filed on May 9, 2012. The disclosures of the PCT Application and the India Application are herein incorporated by reference in their entirety.

With the advance of networking and data storage technologies, an increasingly number of computing services are being provided to users or customers by cloud based datacenters that can enable leased access to computing resources at various levels. Datacenters can provide individuals and organization with a range of solutions for systems deployment and operation. While datacenters are equipped to deal with very large scales of data storage and processing, data storage still costs in terms of resources, bandwidth, speed, and fiscal cost of equipment. Another aspect of datacenter operations is duplication of data (e.g., applications, configuration data, and consumable data) among users.

Fixed-size chunking and content-dependent chunking (CDC) based on Rabin fingerprinting are two common strategies in data deduplication to improve the compression ratio. One desired aspect of effective deduplication is that it be robust when the underlying data has small changes. Content-dependent chunking (or variable size chunking) has some robustness to small changes by incorporating flexible chunksizes. However, existing CDC techniques do not utilize "duplicate data" within larger variable sized chunks that to improve deduplication. Also, apart from the space savings, the deduplication systems need to be capable of performing the deduplication at high throughputs. As deduplication involves processing on large data sets, secondary memory disk bottleneck is a major challenge which may reduce the deduplication throughput.

SUMMARY

The present disclosure generally describes technologies for providing multi-level inline data duplication for datacenter environments.

According to some examples, a method for providing multi-level inline data deduplication may include fingerprinting data to be deduplicated to generate fingerprinted content; dividing the data into multiple chunks, where a size of each chunk depends on a size of corresponding fingerprinted content; dividing each chunk into a variable size sub-chunk and a fixed-size sub-chunk; and deduplicating the fixed-size sub-chunks.

According to other examples, a server configured to perform multi-level inline data deduplication may include a memory configured to store instructions and a processor configured to execute a deduplication application in conjunction with the stored instructions. The processor may be configured to fingerprint data to be deduplicated to generate fingerprinted content; divide the data into multiple chunks, where a size of each chunk depends on a size of corresponding fingerprinted content; divide each chunk into a variable size sub-chunk and a fixed-size sub-chunk; and deduplicate the fixed-size sub-chunks.

According to further examples, a computer readable memory device may have instructions stored thereon for performing multi-level inline data deduplication. The instructions may include generating fingerprinted content from data to be deduplicated; dividing the data into multiple chunks, where a size of each chunk depends on a size of corresponding fingerprinted content; dividing each chunk into a variable size sub-chunk and a fixed-size sub-chunk; and deduplicating the fixed-size sub-chunks.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
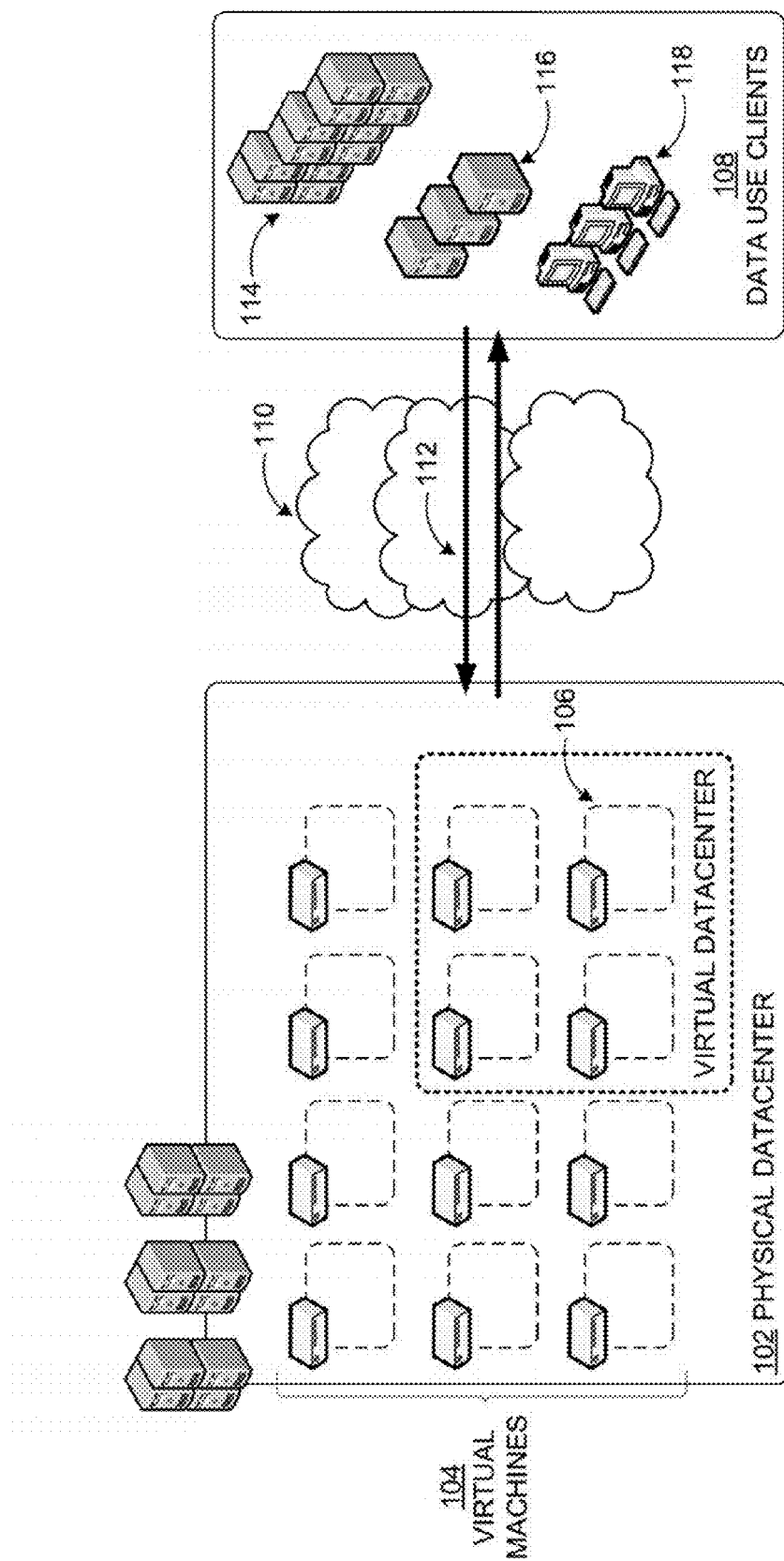
FIG. 1 illustrates an example datacenter, where multi-level inline data duplication may be provided for datacenter environments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to providing multi-level, inline data deduplication for datacenter environments.

Briefly stated, technologies are presented for data deduplication that operates at relatively high throughput and with relatively less storage space than conventional techniques.

Building upon content-dependent chunking (CDC) using Rabin fingerprints, data may be fingerprinted and stored in chunks whose size depends on the size of the fingerprinted content. In some examples, data may be chunked on multiple levels, for example, two levels, in order to prevent sub-chunks common to two or more data chunks from not being deduplicated. For example, at a first level, a CDC algorithm may be employed to fingerprint and chunk data in content-dependent sizes (variable sizes), and at a second level the CDC chunks may be sliced into small fixed-size chunks. The sliced CDC chunks may then be used for deduplication.

FIG. 1 illustrates an example datacenter, where multi-level inline data duplication may be provided for datacenter environments arranged in accordance with at least some embodiments described herein.

As shown in a diagram 100, a physical datacenter 102 may include a multitude of servers and specialized devices such as firewalls, routers, and comparable ones. A number of virtual servers or virtual machines 104 may be established on each server or across multiple servers for providing services to data use clients 108. In some implementations, one or more virtual machines may be grouped as a virtual datacenter 106. Data use clients 108 may include individual users interacting (112) with the datacenter 102 over one or more networks 110 via computing devices 118, enterprise clients interacting with the datacenter 102 via servers 116, or other datacenters interacting with the datacenter 102 via server groups 114.

Modern datacenters are increasingly cloud based entities. Services provided by datacenters include, but are not limited to, data storage, data processing, hosted applications, or even virtual desktops. In many scenarios, a substantial amount of data may be common across multiple users. For example, in a hosted application scenario, users may create copies of the same application with minimal customization. Thus, a majority of the application data, as well as some of the consumed data may be duplicated for a large number of users—with the customization data and some of the consumed data being unique. By deduplicating the common data portions, large amounts of storage space may be saved. Additional resources such as bandwidth and processing capacity may also be saved since that large amount of data does not have to be maintained, copied, and otherwise processed by the datacenter.

In a system according to some examples, data may be chunked on multiple (e.g., two) levels in order to prevent sub-chunks common to two or more data chunks from not being deduplicated. A first stage may employ a CDC algorithm to fingerprint and chunk data in content-dependent sizes with the second or subsequent stages then slicing the CDC chunks into small fixed-size chunks, which may be used for deduplication. Variable sized Chunks may be created by applying a sliding window to the size of the data fingerprinted for CDC. If the decimal equivalent of the last N-bits of the fingerprint equals the predefined number, M, that size may be chosen for the chunk. If not, the window size may slid (e.g., by one byte) and the process repeated until the predefined number results or the maximum chunk size is reached. The fingerprints of the CDC chunks may be computed using a cryptographic hash function (e.g., SHA-1) and stored in a database of fingerprints, which may help in removing redundant variable sized CDC chunks. The CDC chunks may then be divided into fixed-size sub-chunks whose SHA-1 fingerprints may also be computed and stored in a two-dimensional array of cells (part of "fingerprint dictionary"). The sub-chunks may then be deduplicated using the fingerprint dictionary. To optimize space needs, the fingerprint dictionary may contain a component named in-memory Bloom filters which may be designed using Bloom filters operating on the arrays of cells to determine whether a sub-chunk has already been stored. In other examples, one or more bits of the data may be stored with the cell to reduce lookup time.

Figure 2:
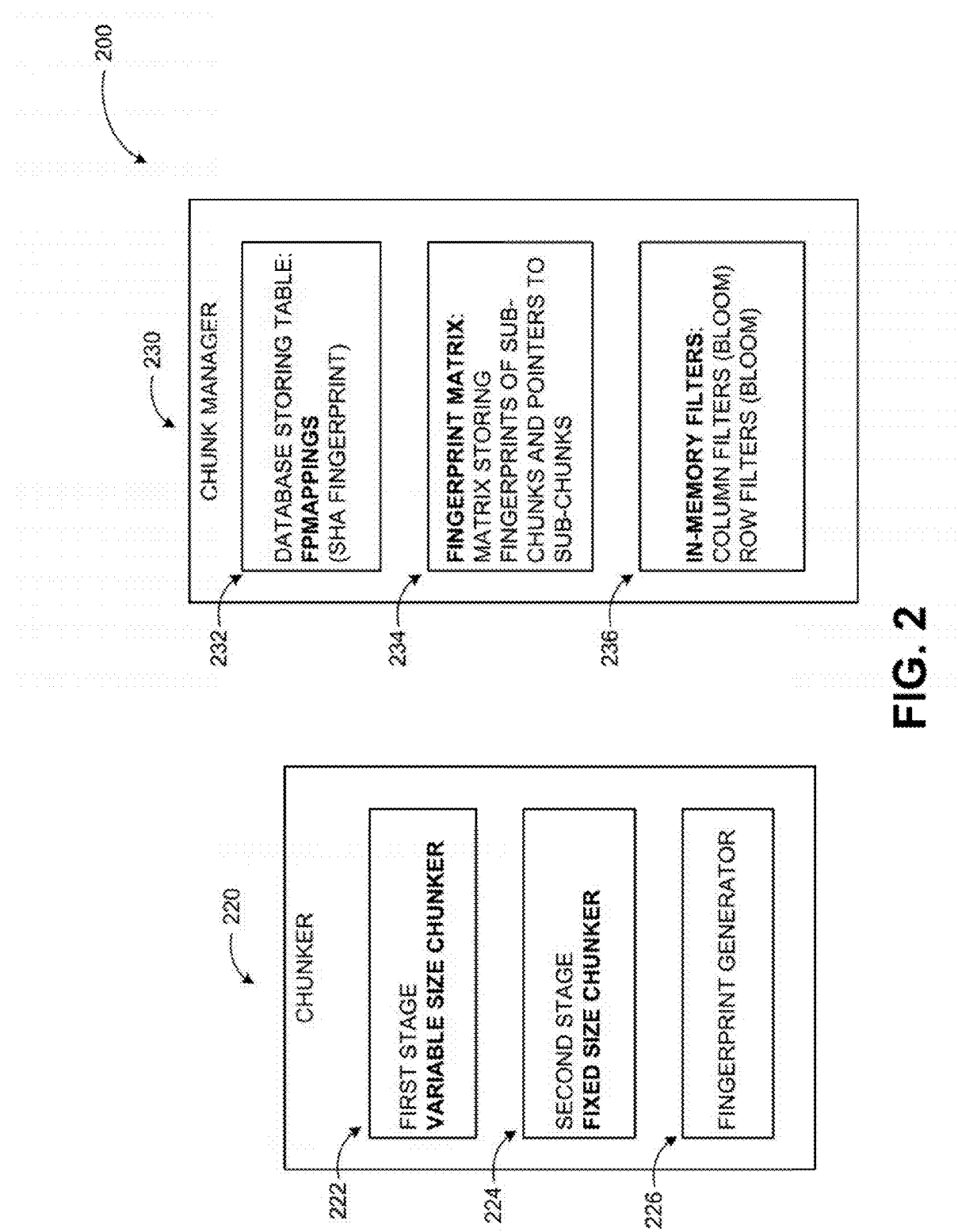
FIG. 2 illustrates an architecture for an example multi-level inline data duplication system.

FIG. 2 illustrates an architecture for an example multi-level inline data duplication system arranged in accordance with at least some embodiments described herein.

As shown in a diagram 200, a multi-level inline deduplication system according to examples may include a chunker 220 and a chunk manager 230. The chunker 220 may receive a data stream and divide the data into chunks. The chunker 220 may partition the data into chunks and sub-chunks using a multi-stage chunking technique. Once the chunks and sub-chunks are generated, their fingerprints may be computed and the chunks, sub-chunks along with their fingerprints may be transferred to the chunk manager 230.

The chunker 220 may include three subcomponents: (1) a first stage variable size chunker 222 for implementing a CDC technique to chunk the data into large chunks; (2) a second stage fixed-size chunker 224 for applying the fixed-size chunking on the large chunks to generate sub-chunks; and (3) a fingerprint generator 226 for computing fingerprints for each chunk (e.g., using SHA-1 hash function). In other examples, multiple stages may be employed.

Each large chunk and its sub-chunks along with their fingerprints may be sent to the chunk manager 230 with one or more of the following parameters defined for the chunker: (1) number of bits (N) of fingerprint to be observed for the predefined number, where the number of bits parameter decides an average size of the large chunks produced by first stage variable size chunker 222; (2) predefined number (M), which may be in the range of $[0, 2^N-1]$; (3) minimum large chunk size; (4) maximum large chunk size; (5) sub-chunk size defining the size of the sub-chunks produced by second stage fixed-size chunker 224; (6) chunk factor, which may be defined as the ratio of the maximum large chunk size to sub-chunk size; and (7) average large chunk size based on which the value of N may be decided (in some examples, the average chunk size may be $2^N$ bytes).

The chunk manager 230 may identify duplicate sub-chunks and store non-duplicate sub-chunks. The chunk manager 230 may maintain an on-disk fingerprint dictionary, which may assist in finding whether a given sub-chunk is a duplicate. For a sub-chunk C, the chunk manager 230 may examine whether C is a duplicate by referring to a fingerprint dictionary, and if C is a duplicate, reject the sub-chunk C, otherwise store the sub-chunk C into a chunk store. The chunk store may generate an address location A for sub-chunk C. Then, the address A can be stored in the fingerprint dictionary.

The chunk manager 230 may include a large chunk database 232 for storing the fingerprints of large chunks produced by the first stage variable size chunker 222 and a fingerprint dictionary of cells, which store the fingerprints of sub-chunks produced by second stage fixed-size chunker 224. The chunk manager 230 may maintain a two dimensional matrix (array) 234 of cells as a part of fingerprint dictionary, which contain the sub-chunk fingerprints. The fingerprint matrix 234 may completely reside in secondary storage (disk). The chunk manager 230 may also maintain one or more in-memory filters 236 (e.g., Bloom filters) to avoid some of the disk accesses needed to support operations such as search and insert of the fingerprint dictionary (not shown). While a two-stage example embodiment is discussed in conjunction with FIG. 2, embodiments may also be implemented using multiple stages, where smaller size chunks may be generated after the first stage generating large chunks.

As will be discussed further below in conjunction with FIG. 4, the fingerprint dictionary may be implemented as a data structure with at least two components, in-memory Bloom filters and the fingerprint matrix. The fingerprint matrix may be a two dimensional array of cells. The fingerprint matrix may reside in disk in some examples. The in-memory Bloom filters, which may reside in main memory in some examples, may serve as a helper index to the fingerprints contained in the fingerprint matrix.

Figure 3:
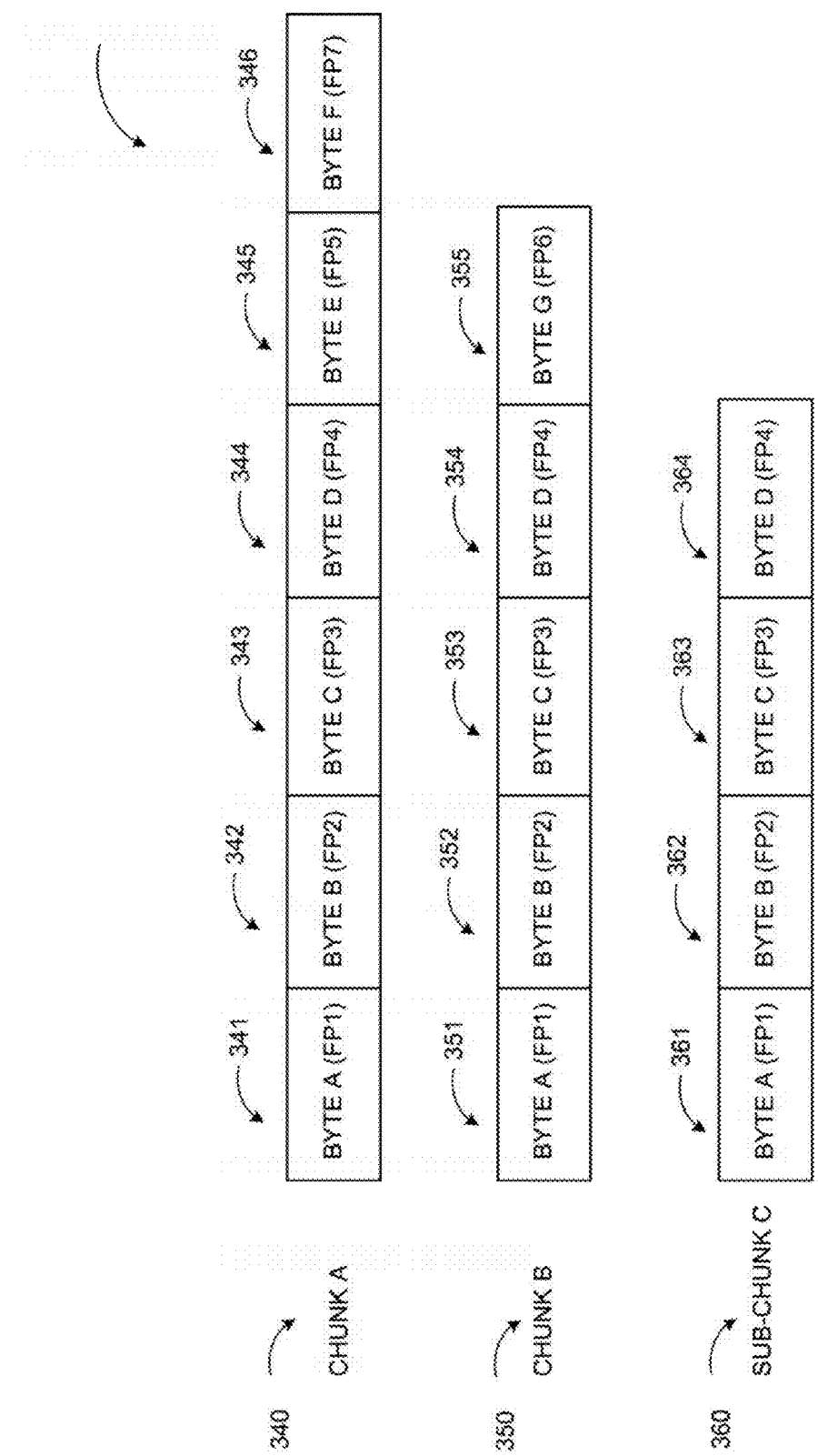
FIG. 3 illustrates example data chunks and sub-chunks that may be processed by a multi-level inline data duplication system.

FIG. 3 illustrates example data chunks and sub-chunks that may be processed by a multi-level inline data duplication system arranged in accordance with at least some embodiments described herein.

In some embodiments, CDC techniques may produce chunks, which may still contain one or more common sub-chunk(s). That is, if A and B are the two chunks produced by employing a CDC technique, there may be another sub-chunk C, which is common to both A and B. The existence of this sub-chunk C may be possible because an endpoint of the chunks is determined based on the property that last N bits of fingerprint equals M.

A diagram 300 in FIG. 3 presents an example scenario, where chunk A 340 and chunk B 350 are generated by a CDC technique. Chunk A 340 may be of 6 bytes and chunk B 350 may be of 5 bytes. In the example scenario, FP1 may be a fingerprint of first byte 341, FP2 may be a fingerprint of second byte 342, FP3 may be a fingerprint of third byte 343, FP4 may be a fingerprint of fourth byte 344, FP5 may be a fingerprint of fifth byte 345, and FP7 may be a fingerprint of sixth byte 346. FP2 may be derived from FP1; FP3 may be derived from FP2; FP4 may be derived from FP3; FP5 may be derived from FP4; and FP7 may be derived from FP5.

In chunk B 350, FP1 may be a fingerprint of first byte 351, FP2 may be a fingerprint of second byte 352, FP3 may be a fingerprint of third byte 353, FP4 may be a fingerprint of fourth byte 354, and FP6 may be a fingerprint of fifth byte 355. In the second chunk, FP2 may be derived from FP1, FP3 may be derived from FP2, FP4 may be derived from FP3, and FP6 may be derived from FP4.

For chunk A 340, last N bits of FP7 may equal to M (a predefined number). For chunk B, last N bits of FP6 may equal to M. Last N-bits of FP1, FP2, FP3, FP4, and FP5 do not equal M. A sub-chunk C 360 including Byte A 361, Byte B 362, Byte C 363, and Byte D 364 is common to both the chunks A 340 and B 350, but this redundancy may be unidentifiable and not exploited by the CDC chunking technique.

In a system according to some examples, a multi-stage chunking technique may be employed that applies at least one other level of chunking on the chunks produced by the CDC technique based on Rabin's fingerprints in the first stage, whereby the chunks produced in first stage are sliced into fixed-size small chunks in additional stages (e.g., second stage). Because fixed-size chunking is relatively simple and less computationally expensive, the overall complexity of the multi-stage chunking technique may be close to the complexity of the single stage CDC chunking technique. In addition, the additional chunking may result in substantial improvement in the storage space savings when compared to the single stage CDC approach.

A chunk factor parameter, as discussed previously, may signify a number of sub-chunks to be produced from a single large CDC chunk. A technique according to some examples may start by initializing the parameters minimum large chunk size to sub-chunk size and maximum large chunk size to a product of chunk factor and sub-chunk size. The minimum large chunk size and the maximum large chunk size may be used to set boundaries to the sizes of the first stage large CDC chunks. The multi-stage chunking technique may receive an array of bytes as input to chunk and output an array of fixed-size chunks. END1 and END2 may represent the chunk boundaries with BOUND1 and BOUND2 representing both ends of a sliding window. Initially, END1 may be set to 1, and END2 may be set to minimum large chunk size. The technique may repeat following operations until no data is left for chunking:

1) Compute fingerprint F for data enclosed in a current window bounds (i.e., from BOUND1 to BOUND2) with a generate chunk procedure taking as input both ends of the sliding window and producing the chunk, and a Rabin fingerprint procedure taking a chunk as input and producing a fingerprint for the chunk.
2) If the decimal equivalent of the last N-bits of F equals to predefined number M, then making the BOUND2 as current chunk boundary and producing a large CDC chunk using the generate chunk procedure with END1 and END2 as inputs. Once the large chunk is been generated, it may be transferred to a fixed-size chunking procedure to slice the large chunk into small fixed-size chunks. The fixed-size chunks may be stored in an output small chunk array.
3) If the decimal equivalent of the last N-bits of F does not equal to M, then the current sliding window may be slid by one or more bytes.
4) If the current large chunk's length, bounded by END1 to BOUND2, crosses the maximum large chunk size, data between END1 to BOUND2 may be selected as large chunk and sliced to fixed-size chunks.

Figure 4:
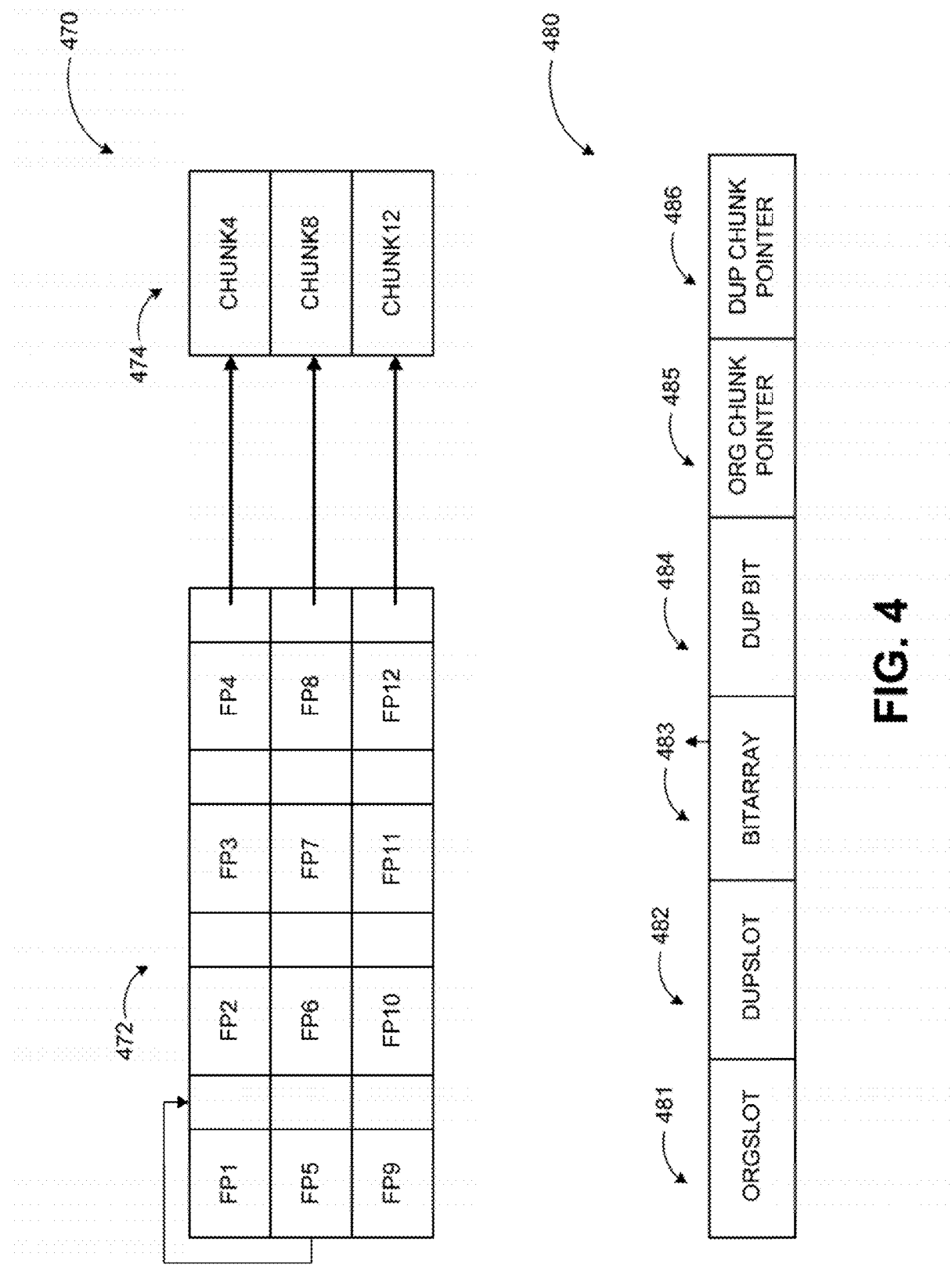
FIG. 4 illustrates example data structures for a fingerprint dictionary employed by a multi-level inline data duplication system.

FIG. 4 illustrates example data structures for a fingerprint dictionary employed by a multi-level inline data duplication system arranged in accordance with at least some embodiments described herein.

The fingerprint dictionary may be formed in different ways. Two example designs are displayed in diagrams 470 and 480 of FIG. 4. According to a first design, the fingerprint dictionary may have two parts: (a) a fingerprint matrix and (b) in-memory Bloom filters. The fingerprint matrix is a two dimensional array of cells (including fingerprints and chunk pointers). A chunk pointer may point to a location (address) in the chunk store, where a corresponding sub-chunk is actually stored. Each row of the fingerprint matrix may include 2* chunk factor columns. Initially, the matrix may be empty. By gradually inserting the fingerprints, the matrix size may grow. A fingerprint may be a 20-byte SHA-1 hash according to some examples. The matrix may be stored completely in secondary storage. In the diagram 470, three example rows of the fingerprint matrix 472 are shown, where pointer columns may point to the actual location of chunks 474 corresponding to the individual fingerprints in the fingerprint matrix 472.

Each row of the fingerprint matrix may fit in disk block size (DBS) bytes on the disk enabling each row of the matrix to be accessed in a single disk access operation. The in-memory filters may include two Bloom filter arrays (e.g., a ColumnFilterArray[ ] and a RowFilterArray[ ]). The ColumnFilterArray[ ] may be an array of Bloom filters. Each Bloom filter in the ColumnFilterArray[ ] may correspond to a column in the matrix. Thus, the ColumnFilterArray[i] may be a summary of fingerprints present in $i^{th}$ column of the fingerprint matrix. Given a sub-chunk fingerprint F, the last [log 2 chunk factor] bits may be extracted from F. Assuming POS is a decimal equivalent of [log 2 chunk factor], if the ColumnFilterArray[POS] Bloom filter does not contain the F, it may imply that the small chunk is not present in the matrix.

RowFilterArray[ ] may be an array of Bloom filters with each filter in the RowFilterArray[ ] corresponding to a row in the matrix. Thus, the RowFilterArray[i] may be a summary of fingerprints present in $i^{th}$ row.

Given a large variable sized chunk fingerprint F and a variable size chunk C, the chunk manager may employ a store chunk procedure to store the sub-chunks resulting from C. The store chunk procedure may be supplied with the large variable sized chunk, large variable sized chunk fingerprint, list of sub-chunks and list of sub-chunk fingerprints. The procedure may first examine whether the large variable sized chunk fingerprint is present in the fingerprint database. If the large chunk fingerprint is present in the fingerprint database, it may be concluded that the large variable sized chunk is a duplicate chunk, and all the sub-chunks may be discarded. Otherwise, the system may add the large variable sized chunk fingerprint to the fingerprint database and scan through each of the sub-chunks. For each sub-chunk SC, the system may examine whether fingerprint of SC is present in the fingerprint matrix using a matrix-is-present procedure. If fingerprint of SC is present in the matrix, SC may be concluded to be a duplicate and discarded; otherwise, the fingerprint of SC may be added to the matrix using a matrix-add-fingerprint procedure.

The matrix-is-present procedure may return a true value if a given fingerprint is present in the fingerprint matrix; otherwise it may return a false value. The matrix-is-present procedure may be supplied with the sub-chunk fingerprint F, extract the last P=[log 2 chunk factor] bits of F, and examine whether the ColumnFilterArray[P] contains F. If the ColumnFilterArray[P] does not contain F, it may be concluded that the fingerprint is not in the matrix. Otherwise, the procedure may access each Bloom filter B in RowFilterArray[ ] and examine whether B contains F. If B does not contain F, the process may proceed to the next filter. Otherwise, a corresponding row of the matrix may be accessed from the disk to memory, and a linear search performed on the entire row for F.

In some example embodiments, the chunk manager may maintain an in-memory matrix row named current row. Instead of accessing the disk for every insert operation of the fingerprint, the fingerprints may be added to the current row. When the current row is full, it may be added to the on-disk fingerprint matrix in single disk access operation. With this delayed writing to disk, a number of disk access operations may be reduced.

The diagram 480 presents an alternative fingerprint dictionary approach according to other example embodiments, in which the above described approach is modified to reduce a number of times secondary memory is accessed. The number of access operations may be estimated by the metric Theoretical Disk Accesses (TDA). By making a row of fingerprint matrix to fit in exactly one disk block, the TDA may be measured by monitoring how many times the rows in fingerprint matrix are accessed during a process of de-duplication.

In the above-described approach, when a Bloom filter in RowFilterArray[ ] infers that the fingerprint may be present, the corresponding row of that matrix needs to be accessed and a row searched through all fingerprints, which may be a computationally expensive process. The search time to find a fingerprint in a row may be reduced by storing some bits along with each fingerprint. As a result, the number of fingerprints stored in a row may eventually decrease, which may result in a decrease of false positive probability of the row Bloom filters, thereby reducing the number of the disk access operations. The fingerprint matrix is a two dimensional array of cells, where each cell may be designed as a structure including two slots for holding fingerprints (an original fingerprint slot and a duplicate fingerprint slot), an array of (chunk factor+1) bits, and two sub-chunk pointers. Each cell may have the following fields: an OrgSlot field 481 storing the original fingerprint; a DupSlot field 482 storing the duplicate fingerprint; a BitArray field 483 storing an array of chunk factor number of bits, where BitArray[i] represents the $i^{th}$ cell in the current row; a DupBit field 484; an original chunk pointer field 485 storing the pointer for the actual location of the chunk (whose fingerprint equals fingerprint stored in OrgSlot) in the chunk store; and a duplicate chunk pointer field 486 storing the pointer for the actual location of the chunk (whose fingerprint equals fingerprint stored in OrgSlot) in the chunk store.

The matrix has chunk factor number of columns making each row to have a maximum 2* chunk factor fingerprints. The DupBit field 484 of $i^{th}$ cell in a row of fingerprint matrix may be set to 1 during the insertion of fingerprint F such that F is hashed to a column number i, but OrgSlot field 481 for the $i^{th}$ cell corresponding to that row is not free. Following example algorithms explain how the fingerprint F may be inserted into the current row (row maintained in memory).

```
Input:      SmallChunk C, SmallChunkFingerprint F.
begin
    K = log₂ ChunkFactor:
    POS = decimal equivalent of last K bits of F;
    Store each fingerprint in Currentrow[POS];
    if Currentrow[POS].Orgslot is free then
    Currentrow[POS].Orgslot = F;
        else
    C = NextFreeDuplicatColumn( Currentrow );
    if C = = NULL then
            Insert Currentrow to the Fingerprint matrix;
            Currentrow = new empty ROW;
            C = NextFreeDuplicateColumn( Currentrow );
    end
    Currentrow[C].DupSlot = F;
    Set Currentrow[POS].BitArray(C) to 1;
    Set Currentrow[POS].DU Pbit to 1;
        end
end
```

Example Algorithm 1—Procedure for Adding to the Matrix—

The NextFreeDuplicateColumn( ) procedure in example algorithm 2 below may take a row of the matrix as input and provide the index 1 of the column in that row where the duplicate slot (DUPSlot) is free.

```
Input: SmallChunk C, SmallChunkFingerprint F.
begin
    found = FALSE;
    index = 0
    filters = RowFilterArray[ ].length( );
    POS = last log₂ChunkFactor bits of F;
    if ColumnFilterArray[POS].contains( F ) = = FALSE then
        C is not present in Matrix;
        found = FALSE;
        return found;
    end
    for index = 1 to chunks do
        TEMP=FALSE;
        if RowFilterArray.contains( F ) = = TRUE then
            Access the required row R = Matrix [index] to main
            memory;
            if R[POS].OrgSlot = = F then
                TEMP = TRUE;
            end
            if R[POS].DUPbit == I then
                for $i^{th}$ bit set in the R[POS].BitArray do
                    if R[i].DUPSlot = = F then
                        TEMP = TRUE;
                    end
                end
            end
        ;
        if TEMP= = TRUE then
```

```
            Perform a byte-by-byte comparison to confirm whether
            small-chunk is a duplicate;
            if C is duplicate then
                found = TRUE;
                break;
            else
                index ++;
            end
        else
            index ++;
        end
    end
    index ++;
  end
  return found;
end
```

Example Algorithm 1—Procedure for Verifying C is Present/not Present in Matrix—

Figure 5:
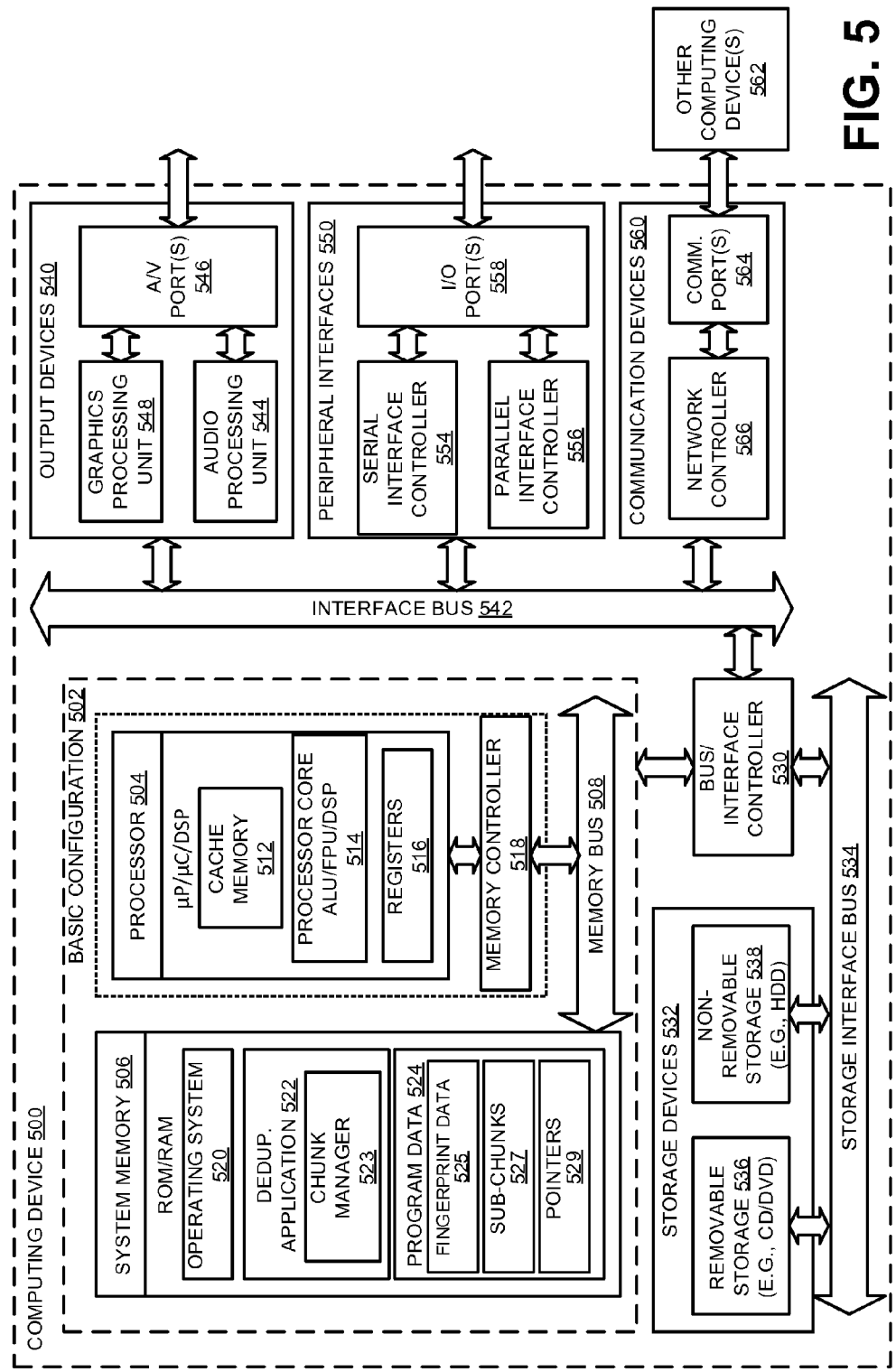
FIG. 5 illustrates a general purpose computing device, which may be used to implement a multi-level inline data duplication system.

FIG. 5 illustrates a general purpose computing device 500, which may be used to implement a multi-level inline data duplication system, in accordance with at least some embodiments described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more deduplication applications 522, and program data 524. The deduplication applications 522 may include a chunk manager 523, which may assist in dividing the data into the multiple chunks employing a Content Dependent Chunking (CDC) algorithm based on Rabin fingerprinting as described herein. The program data 524 may include, among other data, one or more fingerprint data 525, sub-chunks 527, pointers 529, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers at a datacenter, user equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a computer including both laptop computer and non-laptop computer configurations.

Example embodiments may also include methods for incentivizing cross-user deduplication in datacenter environments through storage discounts. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
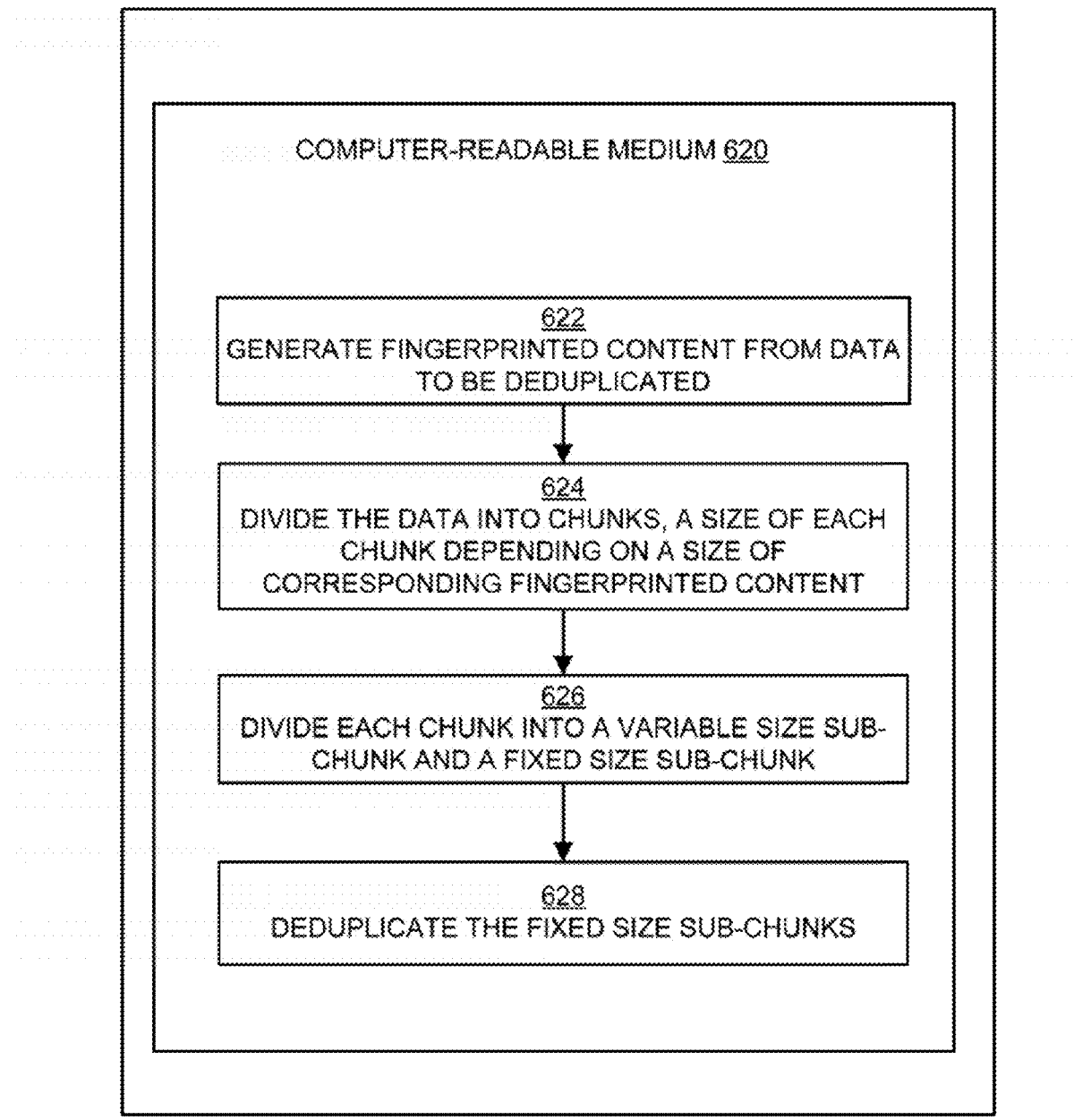
FIG. 6 is a flow diagram illustrating an example method for providing a multi-level inline data duplication system.

FIG. 6 is a flow diagram illustrating an example method for providing a multi-level inline data duplication system that may be performed by a computing device such as the device 500 in FIG. 5, in accordance with at least some embodiments described herein. Example methods may include one or more operations, functions or actions as illustrated by one or more of blocks 622, 624, 626, and/or 628. The operations described in the blocks 622 through 628 may also be stored as computer-executable instructions in a computer-readable medium such as a computer-readable medium 620 of a computing device 610.

An example process of providing a multi-level inline data duplication may begin with block 622, "GENERATE FINGERPRINTED CONTENT FROM DATA TO BE DEDUPLICATED", where the fingerprint generator 226 of the chunker 220 in FIG. 2 may generate fingerprints. Block 622 may be followed by block 624, "DIVIDE THE DATA INTO CHUNKS, A SIZE OF EACH CHUNK DEPENDING ON A SIZE OF CORRESPONDING FINGERPRINTED CONTENT," where the first stage variable size chunker 222 of the chunker 220 may divide the data into large size chunks based on a size of the fingerprinted content.

Block 624 may be followed by block 626, "DIVIDE EACH CHUNK INTO A VARIABLE SIZE SUB-CHUNK AND A FIXED-SIZE SUB-CHUNK". At block 626, the second stage fixed-size chunker 224 may divide the large chunks into fixed-size small chunks. Block 626 may be followed by block 628, "DEDUPLICATE THE FIXED-SIZE SUB-CHUNKS," where the chunk manager may deduplicate the fixed-size sub-chunks employing a fingerprint dictionary to determine duplicate chunks.

The blocks included in the above described process are for illustration purposes. Providing a multi-level inline data duplication may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Figure 7:
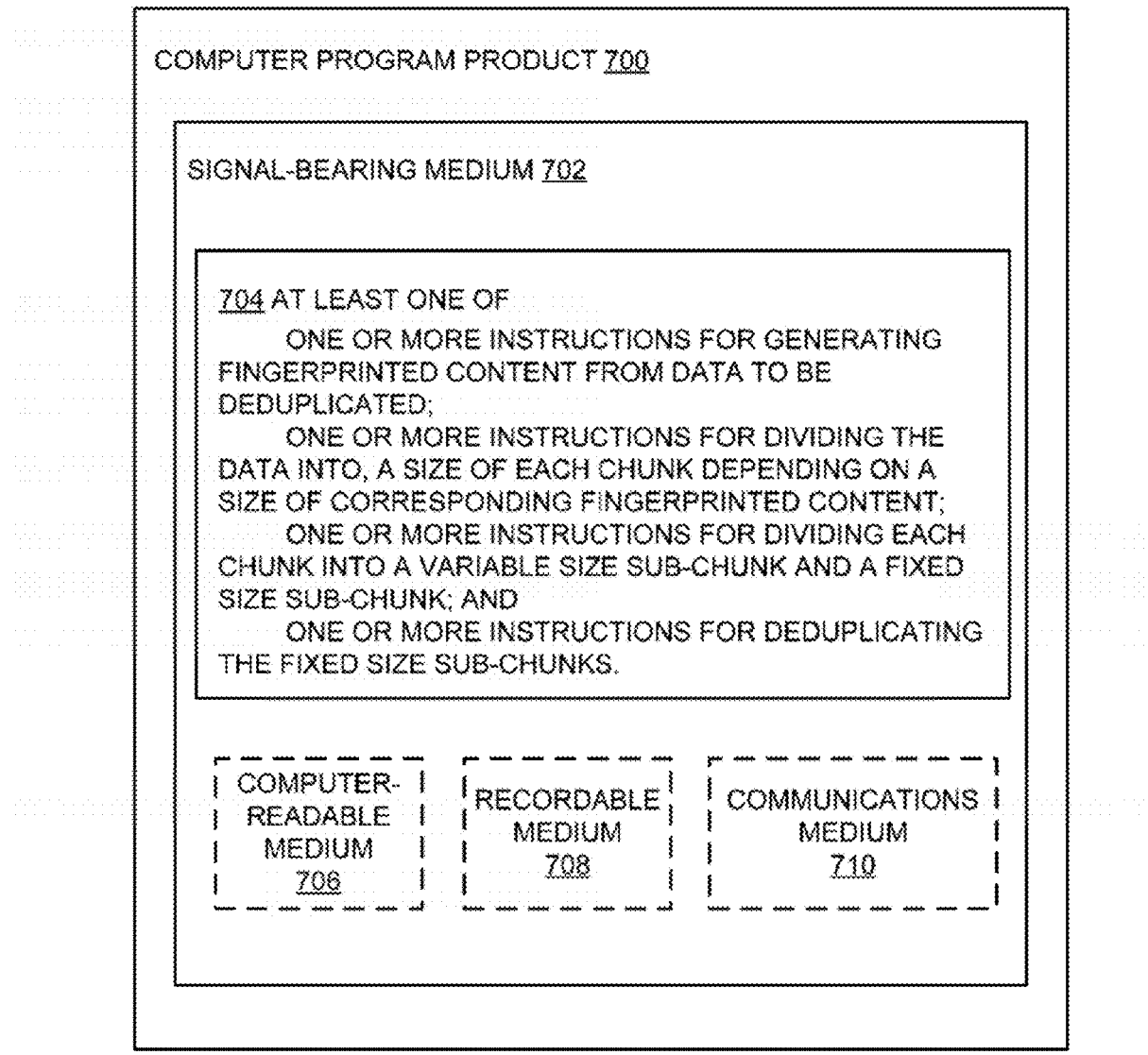
FIG. 7 illustrates a block diagram of an example computer program product, all arranged in accordance with at least some embodiments described herein.

FIG. 7 illustrates a block diagram of an example computer program product 700, arranged in accordance with at least some embodiments described herein. In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the chunk manager 523 may undertake one or more of the tasks shown in FIG. 7 in response to the instructions 704 conveyed to the processor 504 by the medium 702 to perform actions associated with providing multi-level inline data deduplication as described herein. Some of those instructions may include, for example, instructions for generating fingerprinted content from data to be deduplicated; dividing the data into chunks, a size of each chunk depending on a size of corresponding fingerprinted content; dividing each chunk into a variable size sub-chunk and a fixed-size sub-chunk; and deduplicating the fixed-size sub-chunks, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 704 by an RF signal bearing medium, where the signal bearing medium 702 is conveyed by the wireless communications medium 710 (e.g., a wireless communications medium conforming with the IEEE 802.11 standard).

According to some examples, a method for providing multi-level inline data deduplication may include one or more of fingerprinting data to be deduplicated to generate fingerprinted content; dividing the data into a plurality of variable-size chunks, where a size of each variable-size chunk depends on a size of corresponding fingerprinted content; dividing each variable-size chunk into a plurality of fixed-size sub-chunks; and deduplicating the fixed-size sub-chunks.

The method may further include dividing the data into the plurality of variable-size chunks employing a Content Dependent Chunking (CDC) algorithm based on Rabin fingerprinting. The data may be divided into the variable-size chunks by applying a sliding window on the data and determining fingerprint of current content of the window and if a decimal equivalent of last N-bits of the fingerprinted content is equal to a predefined threshold, selecting the size for the variable-size chunk, else sliding the window by one byte and repeating the sliding window based dividing process until a predefined threshold is reached or a predefined maximum size for the variable-size chunks is reached.

The method may also include generating the fingerprinted content employing a cryptographic hash function for the variable-size chunks and the fixed-size sub-chunks, and storing the fingerprinted content to identify the chunks. The cryptographic hash function may be a Secure Hash Algorithm (SHA-1) function. The method may yet include upon dividing the variable-size chunks into the fixed-size sub-chunks, computing fingerprinted content for the fixed-size sub-chunks and storing the fingerprinted content for the fixed-size sub-chunks in a two-dimensional array of cells.

The method may further include storing sub-chunk pointers in the two-dimensional array of cells and/or increasing a size of the two-dimensional array by inserting additional fingerprinted content for the fixed-size sub-chunks into a cell, where each fingerprinted content for the fixed-size sub-chunks is a 20-byte SHA-1 hash. Each cell may include one or more of an original fingerprint, a duplicate fingerprint, an array of a predefined number of bits, a duplication bit, a chunk pointer pointing to a fixed-size sub-chunk whose fingerprint is stored in the original fingerprint, and a chunk pointer pointing to a fixed-size sub-chunk whose fingerprint is stored in the duplicate finger print.

The predefined number may correspond to a number of columns in the two-dimensional array. The chunk pointer for the original fingerprint and the chunk pointer for the duplicate finger print may point to locations in a persistent chunk store. Each bit in the array of the predefined number of bits may correspond to a column in a row of the two dimensional array of cells. The duplication bit may be set to 1 during insertion of a fingerprint such that the fingerprint is hashed to a column. The method may also include employing one or more Bloom filters operating on the two-dimensional array of fingerprinted content and sub-chunk pointers to determine whether a sub-chunk is already stored and a pointer to the stored sub-chunk's location. The Bloom filters may be organized as a Column Filter Array and Row Filter Array of Bloom filters, each Bloom filter in the Column Filter Array corresponding to a column in the two-dimensional array of cells as a summary of fingerprinted content present in a corresponding column of the two-dimensional array of cells and each filter in the Row Filter Array corresponding to a row in the two-dimensional array of cells as a summary of fingerprinted content present in a corresponding row of the two-dimensional array of cells.

The method may further include upon receiving a new fingerprinted content for a fixed-size sub-chunk, scanning the two-dimensional array of cells and determining whether the new fingerprinted content is present in the two-dimensional array of cells; and if the new fingerprinted content is present in the two-dimensional array of cells, discarding the new fingerprinted content, else adding the new fingerprinted content to the two-dimensional array cells. The method may also include adding a new fingerprinted content for a fixed-size sub-chunk by maintaining an in-memory current row; adding a plurality of new fingerprinted content for fixed-size sub-chunks instead of accessing a disk for every insert operation until the current row is full; and when the current row is full, adding the entire current row to the two-dimensional array of cells on the disk.

According to other examples, a server configured to perform multi-level inline data deduplication may include a memory configured to store instructions and a processor configured to execute a deduplication application in conjunction with the stored instructions. The processor may be configured to fingerprint data to be deduplicated to generate fingerprinted content; divide the data into a plurality of variable-size chunks, where a size of each variable-size chunk depends on a size of corresponding fingerprinted content; divide each variable-size chunk into a plurality of fixed-size sub-chunks; and deduplicate the fixed-size sub-chunks.

The processor may divide the data into the plurality of variable-size chunks employing a Content Dependent Chunking (CDC) algorithm based on Rabin fingerprinting. The data may be divided into the variable-size chunks by applying a sliding window on the data and determining fingerprint of current content of the window and if a decimal equivalent of last N-bits of the fingerprinted content is equal to a predefined threshold, selecting the size for the variable-size chunk, else sliding the window by one byte and repeating the sliding window based dividing process until a predefined threshold is reached or a predefined maximum size for the variable-size chunks is reached.

The processor may also generate the fingerprinted content employing a cryptographic hash function for the variable-size chunks and the fixed-size sub-chunks; and store the fingerprinted content to identify the chunks, where the cryptographic hash function is a Secure Hash Algorithm (SHA-1) function. The processor may further compute fingerprinted content for the fixed-size sub-chunks and store the fingerprinted content for the fixed-size sub-chunks in a two-dimensional array of cells upon dividing the variable-size chunks into the fixed-size sub-chunks.

The processor may yet store sub-chunk pointers in the two-dimensional array of cells and increase a size of the two-dimensional array by inserting additional fingerprinted content for the fixed-size sub-chunks into a cell, where each fingerprinted content for the fixed-size sub-chunks is a 20-byte SHA-1 hash. Each cell may include one or more of an original fingerprint, a duplicate fingerprint, an array of a predefined number of bits, a duplication bit, a chunk pointer pointing to a fixed-size sub-chunk whose fingerprint is stored in the original fingerprint, and a chunk pointer pointing to a fixed-size sub-chunk whose fingerprint is stored in the duplicate finger print.

The predefined number may correspond to a number of columns in the two-dimensional array. The chunk pointer for the original fingerprint and the chunk pointer for the duplicate finger print may point to locations in a persistent chunk store. Each bit in the array of the predefined number of bits may correspond to a column in a row of the two dimensional array of cells. The duplication bit may be set to 1 during insertion of a fingerprint such that the fingerprint is hashed to a column. The processor may also employ one or more Bloom filters operating on the two-dimensional array of fingerprinted content and sub-chunk pointers to determine whether a sub-chunk is already stored and a pointer to the stored sub-chunk's location. The Bloom filters may be organized as a Column Filter Array and Row Filter Array of Bloom filters, each Bloom filter in the Column Filter Array corresponding to a column in the two-dimensional array of cells as a summary of fingerprinted content present in a corresponding column of the two-dimensional array of cells and each filter in the Row Filter Array corresponding to a row in the two-dimensional array of cells as a summary of fingerprinted content present in a corresponding row of the two-dimensional array of cells.

The processor may also scan the two-dimensional array of cells and determine whether the new fingerprinted content is present in the two-dimensional array of cells upon receiving a new fingerprinted content for a fixed-size sub-chunk and discard the new fingerprinted content if the new fingerprinted content is present in the two-dimensional array of cells, else add the new fingerprinted content to the two-dimensional array cells. The processor may add a new fingerprinted content for a fixed-size sub-chunk by maintaining an in-memory current row; adding a plurality of new fingerprinted content for fixed-size sub-chunks instead of accessing a disk for every insert operation until the current row is full; and when the current row is full, adding the entire current row to the two-dimensional array of cells on the disk.

According to further examples, a computer readable memory device may have instructions stored thereon for performing multi-level inline data deduplication. The instructions may include one or more of fingerprinting data to be deduplicated to generate fingerprinted content; dividing the data into a plurality of variable-size chunks, where a size of each variable-size chunk depends on a size of corresponding fingerprinted content; dividing each variable-size chunk into a plurality of fixed-size sub-chunks; and deduplicating the fixed-size sub-chunks.

The instructions may further include dividing the data into the plurality of variable-size chunks employing a Content Dependent Chunking (CDC) algorithm based on Rabin fingerprinting. The data may be divided into the variable-size chunks by applying a sliding window on the data and determining fingerprint of current content of the window and if a decimal equivalent of last N-bits of the fingerprinted content is equal to a predefined threshold, selecting the size for the variable-size chunk, else sliding the window by one byte and repeating the sliding window based dividing process until a predefined threshold is reached or a predefined maximum size for the variable-size chunks is reached.

The instructions may also include generating the fingerprinted content employing a cryptographic hash function for the variable-size chunks and the fixed-size sub-chunks, and storing the fingerprinted content to identify the chunks. The cryptographic hash function may be a Secure Hash Algorithm (SHA-1) function. The instructions may yet include upon dividing the variable-size chunks into the fixed-size sub-chunks, computing fingerprinted content for the fixed-size sub-chunks and storing the fingerprinted content for the fixed-size sub-chunks in a two-dimensional array of cells.

The instructions may further include storing sub-chunk pointers in the two-dimensional array of cells and/or increasing a size of the two-dimensional array by inserting additional fingerprinted content for the fixed-size sub-chunks into a cell, where each fingerprinted content for the fixed-size sub-chunks is a 20-byte SHA-1 hash. Each cell may include one or more of an original fingerprint, a duplicate fingerprint, an array of a predefined number of bits, a duplication bit, a chunk pointer pointing to a fixed-size sub-chunk whose fingerprint is stored in the original fingerprint, and a chunk pointer pointing to a fixed-size sub-chunk whose fingerprint is stored in the duplicate finger print.

The predefined number may correspond to a number of columns in the two-dimensional array. The chunk pointer for the original fingerprint and the chunk pointer for the duplicate finger print may point to locations in a persistent chunk store. Each bit in the array of the predefined number of bits may correspond to a column in a row of the two dimensional array of cells. The duplication bit may be set to 1 during insertion of a fingerprint such that the fingerprint is hashed to a column. The instructions may also include employing one or more Bloom filters operating on the two-dimensional array of fingerprinted content and sub-chunk pointers to determine whether a sub-chunk is already stored and a pointer to the stored sub-chunk's location. The Bloom filters may be organized as a Column Filter Array and Row Filter Array of Bloom filters, each Bloom filter in the Column Filter Array corresponding to a column in the two-dimensional array of cells as a summary of fingerprinted content present in a corresponding column of the two-dimensional array of cells and each filter in the Row Filter Array corresponding to a row in the two-dimensional array of cells as a summary of fingerprinted content present in a corresponding row of the two-dimensional array of cells.

The instructions may further include upon receiving a new fingerprinted content for a fixed-size sub-chunk, scanning the two-dimensional array of cells and determining whether the new fingerprinted content is present in the two-dimensional array of cells; and if the new fingerprinted content is present in the two-dimensional array of cells, discarding the new fingerprinted content, else adding the new fingerprinted content to the two-dimensional array cells. The instructions may also include adding a new fingerprinted content for a fixed-size sub-chunk by maintaining an in-memory current row; adding a plurality of new fingerprinted content for fixed-size sub-chunks instead of accessing a disk for every insert operation until the current row is full; and when the current row is full, adding the entire current row to the two-dimensional array of cells on the disk.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to provide multi-level inline data deduplication, the method comprising:
    fingerprinting, by a deduplication application being executed by a physical server of a datacenter, data to be deduplicated to generate fingerprinted content;
    dividing, by a chunk manager of the deduplication application being executed by the physical server of the datacenter, the data into variable-size chunks by an employment of a content dependent chunking (CDC) algorithm based on Rabin fingerprinting to the data, wherein a size of each of the variable-size chunks depends on a size of corresponding fingerprinted content;

dividing, by the chunk manager of the deduplication application being executed by the physical server of the datacenter, each of the variable-size chunks into fixed-size sub-chunks;

computing, by the deduplication application being executed by the physical server of the datacenter, the fingerprinted content of the fixed-size sub-chunks, wherein each of the fingerprinted content for the fixed-size sub-chunks is a 20-byte hash;

storing, by the deduplication application being executed by the physical server of the datacenter, the fingerprinted content of the fixed-size sub-chunks in a two-dimensional array of cells, wherein each cell of the two-dimensional array of cells includes an original fingerprint and an array of a number of bits, and wherein the number of bits reduce a search time to locate the corresponding fingerprinted content for the variable-size chunks by Bloom filters; and deduplicating, by the deduplication application being executed by the physical server of the datacenter, the fixed-size sub-chunks.

2. The method according to claim 1, further comprising:
dividing, by the deduplication application being executed by the physical server of the datacenter, the data into the variable-size chunks by:
applying, by the deduplication application being executed by the physical server of the datacenter, a sliding window on the data and determining the fingerprinted content of the window;
in response to a determination that a decimal equivalent of last N-bits of the fingerprinted content is equal to a threshold, selecting, by the deduplication application being executed by the physical server of the datacenter, the size of each of the variable-size chunks, else
sliding, by the deduplication application being executed by the physical server of the datacenter, the window by one byte and repeating the sliding window based dividing process until one of the threshold is reached and a maximum size of the variable-size chunks is reached.

3. The method according to claim 1, further comprising:
generating, by the deduplication application being executed by the physical server of the datacenter, the fingerprinted content by use of a cryptographic hash function of the variable-size chunks and the fixed-size sub-chunks;
storing, by the deduplication application being executed by the physical server of the datacenter, the fingerprinted content to identify the chunks; and
in response to a division of the variable-size chunks into the fixed-size sub-chunks,
storing, by the deduplication application being executed by the physical server of the datacenter, the fingerprinted content of the fixed-size sub-chunks in the two-dimensional array of cells, wherein each cell in the two-dimensional array of cells further includes a duplicate fingerprint, a duplication bit, a first chunk pointer that points to one of the fixed-size sub-chunks whose fingerprint is stored in the original fingerprint, and a second chunk pointer that points to one of the fixed-size sub-chunks whose fingerprint is stored in the duplicate fingerprint.

4. The method according to claim 3, wherein
the number of bits corresponds to a number of columns in the two-dimensional array;
the first chunk pointer of the original fingerprint and the second chunk pointer of the duplicate fingerprint point to locations in a persistent chunk store;
each bit in the array of the number of bits corresponds to a column in a row of the two dimensional array of cells; and
the duplication bit is set to 1 during insertion of another fingerprint such that the other fingerprint is hashed to another column.

5. The method according to claim 3, further comprising:
organizing, by the deduplication application being executed by the physical server of the datacenter, one or more Bloom filters as a Column Filter Array and Row Filter Array of the one or more Bloom filters,
wherein each of the one or more Bloom filters in the Column Filter Array corresponds to a column in the two-dimensional array of cells as a summary of the fingerprinted content present in a corresponding column of the two-dimensional array of cells, and
wherein each of the one or more Bloom filters in the Row Filter Array corresponds to a row in the two-dimensional array of cells as the summary of the fingerprinted content present in the corresponding row of the two-dimensional array of cells; and
employing, by the deduplication application being executed by the physical server of the datacenter, the one or more Bloom filters that operate on the two-dimensional array of the fingerprinted content and sub-chunk pointers to determine whether one of the fixed size sub-chunks is already stored and a pointer to the location of the fixed-size sub-chunks.

6. The method according to claim 3, further comprising:
in response to receiving a new fingerprinted content of one of the fixed-size sub-chunks,
scanning, by the deduplication application being executed by the physical server of the datacenter, the two-dimensional array of cells; and
determining if the new fingerprinted content is present in the two-dimensional array of cells; and
in response to a determination that the new fingerprinted content is present in the two-dimensional array of cells,
discarding, by the deduplication application being executed by the physical server of the datacenter, the new fingerprinted content, else
adding the new fingerprinted content to the two-dimensional array cells.

7. The method according to claim 6, further comprising:
adding, by the deduplication application being executed by the physical server of the datacenter, the new fingerprinted content of one of the fixed-size sub-chunks by:
maintaining, by the deduplication application being executed by the physical server of the datacenter, an in-memory current row;
adding, by the deduplication application being executed by the physical server of the datacenter, the new fingerprinted content of the fixed-size sub-chunks instead of accessing a disk for every insert operation until the current row is full; and
in response to a determination that the current row is full, adding, by the deduplication application being executed by the physical server of the datacenter, the current row to the two-dimensional array of cells on the disk.

8. A server configured to perform multi-level inline data deduplication, the server comprising:
a memory configured to store instructions; and
a deduplication application configured to be executed by the server in conjunction with the stored instructions, wherein the deduplication application is configured to:
fingerprint data to be deduplicated to generate fingerprinted content;
divide, by a chunk manager of the deduplication application, the data into variable-size chunks by an employment of a content dependent chunking (CDC) algorithm based on Rabin fingerprinting to the data, wherein a size of each of the variable-size chunks depends on a size of corresponding fingerprinted content;
divide, by the chunk manager, each of the variable-size chunks into fixed-size sub-chunks; compute the fingerprinted content of the fixed-size sub-chunks, wherein each of the fingerprinted content for the fixed-size sub-chunks is a 20-byte hash;
store the fingerprinted content of the fixed-size sub-chunks in a two-dimensional array of cells, wherein each cell of the two-dimensional array of cells includes an original fingerprint and an array of a number of bits, and wherein the number of bits reduce a search time to locate the corresponding fingerprinted content for the variable-size chunks by Bloom filters; and
deduplicate the fixed-size sub-chunks.

9. The server according to claim 8, wherein the deduplication application is further configured to:
divide the data into the variable-size chunks by:
applying a sliding window on the data and determining the fingerprinted content of the window;
in response to a determination that a decimal equivalent of last N-bits of the fingerprinted content is equal to a threshold,
selecting the size of each of the variable-size chunks, else
sliding the window by one byte and repeating the sliding window based dividing process until one of the threshold is reached and a maximum size of the variable-size chunks is reached.

10. The server according to claim 8, wherein the deduplication application is further configured to:
generate the fingerprinted content that employs a cryptographic hash function of the variable-size chunks and the fixed-size sub-chunks; and
store the fingerprinted content to identify the chunks, wherein the cryptographic hash function is a Secure Hash Algorithm (SHA-1) function.

11. The server according to claim 10, wherein the deduplication application is further configured to:
in response to a division of the variable-size chunks into the fixed-size sub-chunks,
compute the fingerprinted content of the fixed-size sub-chunks, and
store the fingerprinted content of the fixed-size sub-chunks in the two-dimensional array of cells; and
store sub-chunk pointers in the two-dimensional array of cells.

12. The server according to claim 10, wherein the deduplication application is further configured to:
increase a size of the two-dimensional array by an insertion operation of additional fingerprinted content of the fixed-size sub-chunks into a cell, wherein each of the additional fingerprinted content of the fixed-size sub-chunks is a 20-byte SHA-1 hash.

13. The server according to claim 10, wherein
the number of bits corresponds to a number of columns in the two-dimensional array;
a first chunk pointer of the original fingerprint and a second chunk pointer of the duplicate fingerprint point to locations in a persistent chunk store;
each bit in the array of the number of bits corresponds to a column in a row of the two dimensional array of cells; and
a duplication bit is set to 1 during insertion of another fingerprint such that the other fingerprint is hashed to another column.

14. The server according to claim 10, wherein the deduplication application is further configured to:
employ one or more Bloom filters that operate on the two-dimensional array of the fingerprinted content and sub-chunk pointers to determine whether one of the fixed-size sub-chunks is already stored and a pointer to the location of the fixed-size sub-chunks.

15. The server accord in to claim 10, wherein the deduplication application is further configured to:
in response to receiving a new fingerprinted content of one of the fixed-size sub-chunks,
scan the two-dimensional array of cells, and
determine whether the new fingerprinted content is present in the two-dimensional array of cells; and
in response to a determination that the new fingerprinted content is present in the two-dimensional array of cells, discard the new fingerprinted content, else
add the new fingerprinted content to the two-dimensional array cells.

16. A computer readable memory device with instructions stored thereon to perform multi-level inline data deduplication, the instructions comprising:
fingerprinting, by a deduplication application being executed a physical server of a datacenter, data to be deduplicated to generate fingerprinted content;
dividing, by a chunk manager of the deduplication application being executed by the physical server of the datacenter, the data into variable-size chunks by an employment of a content dependent chunking (CDC) algorithm based on Rabin fingerprinting to the data, wherein a size of each of the variable-size chunks depends on a size of corresponding fingerprinted content;
dividing, by the chunk manager of the deduplication application being executed by the physical server of the datacenter, each of the variable-size chunks into fixed-size sub-chunks;
computing, by the deduplication application being executed by the physical server of the datacenter, the fingerprinted content of the fixed-size sub-chunks, wherein each of the fingerprinted content for the fixed-size sub-chunks is a 20-byte hash;
storing, by the deduplication application being executed by the physical server of the datacenter, the fingerprinted content of the fixed-size sub-chunks in a two-dimensional array of cells, wherein each cell of the two-dimensional array of cells includes an original fingerprint and an array of a number of bits, and wherein the number of bits reduce a search time to locate the corresponding fingerprinted content for the variable-size chunks; and
deduplicating, by the deduplication application being executed by the physical server of the datacenter, the fixed-size sub-chunks.

17. The computer readable memory device according to claim 16, wherein the data is divided into the variable-size chunks by:
  applying, by the deduplication application being executed by the physical server of the datacenter, a sliding window on the data and determining the fingerprinted content of the window;
  in response to a determination that a decimal equivalent of last N-bits of the fingerprinted content is equal to a threshold, selecting, by the deduplication application being executed by the physical server of the datacenter, the size of each of the variable-size chunks, else
  sliding, by the deduplication application being executed by the physical server of the datacenter, the window by one byte and repeating the sliding window based dividing process until one of the threshold is reached and a maximum size of the variable-size chunks is reached.

18. The computer readable memory device according to claim 16, wherein the instructions further comprise:
  generating, by the deduplication application being executed by the physical server of the datacenter, the fingerprinted content that employs a cryptographic hash function of the variable-size chunks and the fixed-size sub-chunks;
  storing, by the deduplication application being executed by the physical server of the datacenter, the fingerprinted content to identify the chunks;
  in response to dividing the variable-size chunks into the fixed-size sub-chunks,
    computing, by the deduplication application being executed by the physical server of the datacenter, the fingerprinted content of the fixed-size sub-chunks, and
    storing the fingerprinted content of the fixed-size sub-chunks in the two-dimensional array of cells; and
  storing, by the deduplication application being executed by the physical server of the datacenter, sub-chunk pointers in the two-dimensional array of cells.

19. The computer readable memory device according to claim 18, wherein the instructions further comprise:
  in response to receiving a new fingerprinted content of one of the fixed-size sub-chunks,
    scanning, by the deduplication application being executed by the physical server of the datacenter, the two-dimensional array of cells, and
    determining whether the new fingerprinted content is present in the two-dimensional array of cells; and
  in response to a determination that the new fingerprinted content is present in the two-dimensional array of cells,
    discarding, by the deduplication application being executed by the physical server of the datacenter, the new fingerprinted content, else
    adding the new fingerprinted content to the two-dimensional array cells by:
      maintaining, by the deduplication application being executed by the physical server of the datacenter, an in-memory current row;
      adding, by the deduplication application being executed by the physical server of the datacenter, the new fingerprinted content of the fixed-size sub-chunks instead of accessing a disk for every insert operation until the current row is full; and
      in response to a determination that the current row is full, adding, by the deduplication application being executed by the physical server of the datacenter, the current row to the two-dimensional array of cells on the disk.

* * * * *

UNITED STATES PATENT AND TRADEMARK OFFICE
CERTIFICATE OF CORRECTION

PATENT NO. : 9,311,323 B2  
APPLICATION NO. : 13/885395  
DATED : April 12, 2016  
INVENTOR(S) : Chakraborty et al.

Page 1 of 1

It is certified that error appears in the above-identified patent and that said Letters Patent is hereby corrected as shown below:

In the specification,

In Column 1, Line 7, delete "§371" and insert -- § 371 --, therefor.

In Column 2, Line 35, delete "system:" and insert -- system; --, therefor.

In Column 2, Line 38, delete "system:" and insert -- system; --, therefor.

In Column 18, Line 16, delete "A. B," and insert -- A, B, --, therefor.

In the claims,

In Column 22, Line 23, in Claim 15, delete "accord in" and insert -- according --, therefor.

In Column 22, Line 39, in Claim 16, delete "executed a" and insert -- executed by a --, therefor.

Signed and Sealed this  
Fifth Day of July, 2016

Michelle K. Lee  
*Director of the United States Patent and Trademark Office*